US010848583B2

(12) United States Patent
Yellin et al.

(10) Patent No.: US 10,848,583 B2
(45) Date of Patent: Nov. 24, 2020

(54) FRESHNESS-AWARE PRESENTATION OF CONTENT IN COMMUNICATION TERMINALS

(71) Applicant: Tensera Networks Ltd., Adanim (IL)

(72) Inventors: Daniel Yellin, Raanana (IL); David Ben Eli, Modiin (IL); Roee Peled, Givatayim (IL); Shimon Moshavi, Beit Shemesh (IL)

(73) Assignee: TENSERA NETWORKS LTD., Hod Hasharon (IL)

( * ) Notice: Subject to any disclaimer, the term of this patent is extended or adjusted under 35 U.S.C. 154(b) by 50 days.

(21) Appl. No.: 15/279,488

(22) Filed: Sep. 29, 2016

(65) Prior Publication Data

US 2017/0111465 A1    Apr. 20, 2017

Related U.S. Application Data

(60) Provisional application No. 62/241,779, filed on Oct. 15, 2015.

(51) Int. Cl.
*H04L 29/06* (2006.01)
*H04L 29/08* (2006.01)

(52) U.S. Cl.
CPC ........ *H04L 67/2842* (2013.01); *H04L 65/605* (2013.01); *H04L 67/1076* (2013.01)

(58) Field of Classification Search
CPC ..... H04L 67/2842; H04L 67/02; H04L 43/16; H04L 29/08072; H04L 67/142; H04L 67/42; H04L 41/0253; G06F 2212/1024; G06F 2212/60; G06F 2212/608; G06F 2212/62; G06F 17/2288; G06F 17/3002; G06F 17/30132; G06F 17/30867; G06F 2212/602; G06F 17/30893; G06F 17/30902; G06F 12/0802; G06F 12/0815;
(Continued)

(56) References Cited

U.S. PATENT DOCUMENTS 6,182,133 B1 * 1/2001 Horvitz ............. G06F 17/30902
707/999.008
6,385,641 B1 * 5/2002 Jiang ....................... H04L 29/06
709/203
(Continued)

FOREIGN PATENT DOCUMENTS

GB          2350213 A       11/2000

OTHER PUBLICATIONS

Fielding et al., Hypertext Transfer Protocol—HTTP/1.1, Jun. 1999, Networking Group, Request for Comments 2616; pp. 1-24 (Year: 1999).*

(Continued)

*Primary Examiner* — Tonia L Dollinger
*Assistant Examiner* — Linh T. Nguyen
(74) *Attorney, Agent, or Firm* — Kligler & Associates Patent Attorneys Ltd (57) ABSTRACT

A method includes caching content items in a cache memory of a communication terminal connected to a communication network. A content item, which is cached in the cache memory, is presented to a user of the communication terminal. An extent of freshness of the cached content item presented to the user is assessed. Presentation of the cached content item is conditionally modified depending on the assessed extent of freshness.

28 Claims, 3 Drawing Sheets

(58) Field of Classification Search
CPC .......... G06F 8/65; G06F 16/95; G06F 16/955;
G06F 16/9574; G06F 21/6263; G06F
2221/2143; G06F 3/0673; G06F 11/1461;
G06F 16/273; G06F 16/93; G06F 3/1462;
H04W 88/02; H04W 40/18; H04W 40/20;
H04W 48/18; G01C 21/32; G01C 21/36;
G01C 21/3667; G01C 22/00; G06T 7/136
USPC ........ 709/213, 201, 203, 231, 238; 710/313;
711/118, 122, E12.026
See application file for complete search history.

(56) References Cited

U.S. PATENT DOCUMENTS

| | | | |
|---|---|---|---|
| 6,553,409 B1* | 4/2003 | Zhang et al. | G06F 12/00 709/213 |
| 6,606,525 B1 | 8/2003 | Muthuswamy et al. | |
| 6,766,352 B1* | 7/2004 | McBrearty | H04L 67/00 709/203 |
| 6,954,786 B1* | 10/2005 | Vered | H04L 41/024 709/202 |
| 7,437,364 B1* | 10/2008 | Fredricksen | G06F 17/30011 |
| 7,461,206 B2* | 12/2008 | Bhanoo | G06F 17/30902 707/E17.12 |
| 8,200,626 B1* | 6/2012 | Katzer | G06F 16/172 707/621 |
| 8,438,474 B1* | 5/2013 | Lloyd | H04N 9/12 345/1.1 |
| 8,447,837 B2 | 5/2013 | Devanneaux et al. | |
| 8,566,867 B1 | 10/2013 | Yang et al. | |
| 8,601,052 B2 | 12/2013 | Mir et al. | |
| 8,635,339 B2 | 1/2014 | Luna | |
| 8,849,731 B2 | 9/2014 | Lymberopoulos et al. | |
| 8,886,176 B2 | 11/2014 | Luna et al. | |
| 8,990,685 B1 | 3/2015 | Sandoval et al. | |
| 9,043,433 B2 | 5/2015 | Backholm | |
| 9,049,179 B2 | 6/2015 | Luna | |
| 9,111,309 B2 | 8/2015 | Howard et al. | |
| 9,118,623 B2 | 8/2015 | Devanneaux et al. | |
| 9,208,123 B2 | 12/2015 | Luna | |
| 9,247,019 B2 | 1/2016 | Luna et al. | |
| 9,256,484 B2 | 2/2016 | Stanley-Marbell et al. | |
| 9,307,007 B2 | 4/2016 | Kapadia et al. | |
| 9,392,393 B2 | 7/2016 | Wood et al. | |
| 9,407,713 B2 | 8/2016 | Luna et al. | |
| 9,641,591 B1* | 5/2017 | Kolam | H04L 67/2823 |
| 2001/0020248 A1* | 9/2001 | Banga | H04L 29/06 709/219 |
| 2003/0041306 A1* | 2/2003 | Takahashi | H04N 1/0044 715/209 |
| 2003/0188106 A1* | 10/2003 | Cohen | H04L 67/1095 711/133 |
| 2003/0204678 A1* | 10/2003 | Lee | H04L 29/06 711/144 |
| 2004/0083348 A1* | 4/2004 | Chang | G06F 12/0246 711/202 |
| 2004/0128346 A1* | 7/2004 | Melamed | H04L 29/06 709/203 |
| 2009/0019153 A1 | 1/2009 | Sebastian | |
| 2010/0030963 A1* | 2/2010 | Marcu | G06F 12/0888 711/118 |
| 2010/0161717 A1* | 6/2010 | Albrecht | G06F 16/9574 709/203 |
| 2010/0161831 A1 | 6/2010 | Haas et al. | |
| 2010/0180081 A1* | 7/2010 | Bose | G06F 1/3203 711/122 |
| 2010/0332589 A1* | 12/2010 | Schwimer | G06F 17/30893 709/203 |
| 2011/0060881 A1 | 3/2011 | Gallagher | |
| 2012/0096129 A1 | 4/2012 | Green | |
| 2012/0112662 A1* | 5/2012 | Hatley | H05B 47/175 315/294 |
| 2013/0268733 A1* | 10/2013 | Narayanan | G06F 12/0888 711/119 |
| 2014/0101389 A1* | 4/2014 | Nellans | G06F 12/08 711/137 |
| 2014/0362768 A1 | 12/2014 | Wood et al. | |
| 2014/0364104 A1 | 12/2014 | Wood et al. | |
| 2014/0366041 A1 | 12/2014 | Stanley-Marbell et al. | |
| 2014/0366042 A1 | 12/2014 | Chan et al. | |
| 2014/0372511 A1 | 12/2014 | Kapadia et al. | |
| 2014/0373032 A1 | 12/2014 | Merry et al. | |
| 2014/0379840 A1 | 12/2014 | Dao | |
| 2015/0019686 A1* | 1/2015 | Backholm | H04L 47/32 709/217 |
| 2015/0120821 A1 | 4/2015 | Bendell et al. | |
| 2015/0241941 A1 | 8/2015 | Luna et al. | |
| 2015/0256641 A1 | 9/2015 | Agarwal et al. | |
| 2015/0296505 A1 | 10/2015 | Luna et al. | |
| 2015/0347204 A1 | 12/2015 | Stanley-Marbell et al. | |
| 2015/0347205 A1 | 12/2015 | Stanley-Marbell et al. | |
| 2015/0347907 A1 | 12/2015 | Mathew et al. | |
| 2015/0347908 A1 | 12/2015 | Mathew et al. | |
| 2015/0350807 A1 | 12/2015 | Andrews et al. | |
| 2015/0350885 A1 | 12/2015 | Stanley-Marbell et al. | |
| 2015/0351033 A1 | 12/2015 | Stanley-Marbell et al. | |
| 2015/0356259 A1* | 12/2015 | Park | G06Q 50/22 705/2 |
| 2015/0365904 A1 | 12/2015 | Luna et al. | |
| 2016/0021211 A1 | 1/2016 | Yellin et al. | |
| 2016/0191651 A1 | 6/2016 | Balakrishnan et al. | |
| 2016/0191664 A1 | 6/2016 | Balakrishnan et al. | |
| 2016/0205028 A1 | 7/2016 | Luna et al. | |
| 2017/0111465 A1* | 4/2017 | Yellin | H04L 65/605 |

OTHER PUBLICATIONS

International Application # PCT/IB2016/055835 Search Report dated Jan. 26, 2017.
International Application # PCT/IB2018/054460 Search Report dated Sep. 17, 2018.
Yan et al., "Fast App Launching for Mobile Devices Using Predictive User Context", MobiSys 12, 14 pages, Jun. 25-29, 2012.
Andraus et al., "File Prefetching for Mobile Devices Using On-Line Learning", 10 pages, Aug. 2008.
Chinese Application # 201680050956X Office Action dated Jun. 19, 2020.

* cited by examiner

FIG. 3A ns of the present invention
FRESHNESS-AWARE PRESENTATION OF CONTENT IN COMMUNICATION TERMINALS

CROSS-REFERENCE TO RELATED APPLICATIONS

This application claims the benefit of U.S. Provisional Patent Application 62/241,779, filed Oct. 15, 2015, whose disclosure is incorporated herein by reference.

FIELD OF THE INVENTION

The present invention relates generally to communication networks, and particularly to methods and systems for freshness-aware presentation of content in communication terminals.

BACKGROUND OF THE INVENTION

Various data services and applications present content to users of mobile phones and other communication terminals. For example, some data services and applications employ prefetching schemes for reducing latency and enhancing user experience. Prefetched content is typically cached in a memory of the terminal, and presented to the user when requested, with small latency.

SUMMARY OF THE INVENTION

An embodiment of the present invention that is described herein provides a method including caching content items in a cache memory of a communication terminal connected to a communication network. A content item, which is cached in the cache memory, is presented to a user of the communication terminal. An extent of freshness of the cached content item presented to the user is assessed. Presentation of the cached content item is conditionally modified depending on the assessed extent of freshness.

In some embodiments, caching the content items includes prefetching the content items over the communication network. In some embodiments, presenting the cached content item is performed regardless of the extent of freshness of the cached content item. In an embodiment, assessing the extent of freshness includes determining a soft, non-binary freshness metric for the cached content item.

In some embodiments, conditionally modifying the presentation includes deciding, depending on the assessed extent of freshness, whether to present an updated version of the content item available over the communication network, in place of the cached content item. In an embodiment, assessing the extent of freshness includes detecting that the updated version, more up-to-date than the cached content item, is available over the communication network, and deciding whether to present the updated version includes choosing to present the cached content item even though the updated version is available.

In another embodiment, assessing the extent of freshness includes evaluating a distance metric between the cached content item and the updated version, and conditionally modifying the presentation includes deciding, depending on the distance metric, whether to present the updated version. In yet another embodiment, assessing the extent of freshness includes evaluating a distance metric between the cached content item and the updated version, and conditionally modifying the presentation includes deciding, depending on the distance metric, whether to fetch the updated version over the communication network. In still another embodiment, assessing the extent of freshness includes identifying that a cost measure of retrieving the updated version over the network exceeds a predefined threshold, and conditionally modifying the presentation includes choosing to present the cached content item even though the updated version is available.

In some embodiments, conditionally modifying the presentation includes: when the extent of freshness is below a first threshold, deciding to present only an updated version of the content item, and to stop presenting the cached content item; when the distance metric is above a second threshold, deciding to continue presenting the cached content item even though the updated version is available; and when the distance metric is between the first and second thresholds, deciding to present the cached content item while fetching the updated version, and to replace the cached content item with the updated version once the updated version has been fetched.

In a disclosed embodiment, assessing the extent of freshness includes comparing a first signature, which is calculated over the content item that is cached in the cache memory, with a second signature, which is calculated over a version of the content item available over the communication network. In an embodiment, the method further includes receiving an indication of the extent of freshness before prefetching the content item, and setting a priority of prefetching the content item based on the indication.

In some embodiments, conditionally modifying the presentation includes disregarding a freshness-related field in a header of a HTTP response in which the cached content item was provided to the communication terminal. In an embodiment, disregarding the freshness-related field is performed when operating in a guaranteed-prefetching mode, and not when operating in a best-effort prefetching mode.

In another embodiment, assessing the extent of freshness includes setting the extent of freshness based on an expiry time reported for the content item. In yet another embodiment, assessing the extent of freshness includes setting the extent of freshness based on an age metric or version number of the content item.

In some embodiments, the method further includes presenting to the user an indication indicative of the extent of freshness of the presented content item. Presenting the indication may include presenting a first visual indication when the content item is assessed to be fresh, and a second visual indication, different from the first visual indication, when the content item is assessed to be not fresh. Alternatively, presenting the indication may include presenting the indication when the content item is assessed to be not fresh, and not presenting the indication when the content item is assessed to be fresh. In an embodiment, assessing the extent of freshness includes detecting that it is currently impossible to verify whether an updated version of the content item is available over the communication network.

There is additionally provided, in accordance with an embodiment of the present invention, a communication terminal including a cache memory and a processor. The processor is configured to cache content items in the cache memory, to present a content item, which is cached in the cache memory, to a user of the communication terminal, to assess an extent of freshness of the cached content item that is presented to the user, and to conditionally modify presentation of the cached content item depending on the assessed extent of freshness.

There is further provided, in accordance with an embodiment of the present invention, a computer software product, the product including a tangible non-transitory computer-readable medium in which program instructions are stored, which instructions, when read by a processor in a communication terminal, cause the one or more processors to cache content items in a cache memory of the communication terminal, to present a content item, which is cached in the cache memory, to a user of the communication terminal, to assess an extent of freshness of the cached content item that is presented to the user, and to conditionally modify presentation of the cached content item depending on the assessed extent of freshness.

The present invention will be more fully understood from the following detailed description of the embodiments thereof, taken together with the drawings in which:

DETAILED DESCRIPTION OF EMBODIMENTS

Overview

In many practical scenarios, communication terminals run the risk of presenting outdated content to their users. Consider, for example, a communication terminal that prefetches content from a content source over a communication network, caches the prefetched content, and later presents the cached content to the user. In practice, it is quite possible that by the time the cached content is presented to the user, a more up-to-date ("fresher") version of the content is available over the network. In such a case, the version of the content presented to the user is not the most up-to-date version available.

It is possible to partially overcome the above scenario by proactively notifying the communication terminal whenever an updated version of the content becomes available. Even so, update notifications may not always be received correctly at the terminal, and/or some time may elapse until the terminal actually possesses the updated version. These scenarios again result in failure to present the most up-to-date version of the content.

As yet another example, some types of content become outdated and unsuitable for presentation after a certain period of time, regardless of whether a more up-to-date version is available. Limited-time commercial offers, stock quotes and weather forecasts are just a few examples of such content. Conventional prefetching and content delivery schemes do not consider these factors, and may therefore present outdated content.

Embodiments of the present invention provide improved methods and systems for presenting content to users of communication terminals. The disclosed techniques consider the extent of freshness of content in deciding whether and how to present the content. Typically, the terminal presents a cached version of a content item, and only then assesses the extent of freshness of the cached version and possibly replaces the currently-presented version with a fresher version. Various definitions of content freshness, including soft, non-binary freshness metrics, and various techniques for assessing the freshness of a content item, are described herein.

In some embodiments, the terminal deliberately decides to continue presenting the cached version of a content item, even though it finds that a more up-to-date version is available over the network. The cached version may be retained, for example, if it is sufficiently similar to the updated version. Various similarity criteria that can be used for this purpose are described. As another example, the terminal may consider the cost of fetching the updated version, e.g., in terms of monetary cost, power consumption or other cost measures.

In some embodiments, the terminal presents to the user visual indications that are indicative of the extent of freshness of the content being presented. Using this technique, the user can be reassured he or she is being presented with the most up-to-date version of the content, or at least be notified that the content may be outdated. Some indications quantify the extent of freshness, e.g., by displaying the actual time the content was created or obtained, or the time its freshness was last verified.

Additional freshness-aware content presentation techniques are also described herein. By presenting content in a freshness-aware manner, the disclosed techniques enhance user experience considerably. Although the embodiments described herein refer mainly to systems that employ prefetching, the disclosed techniques are not limited to prefetching, and can be used in any environment or application in which content available over a network is also cached.

System Description

Figure 1:
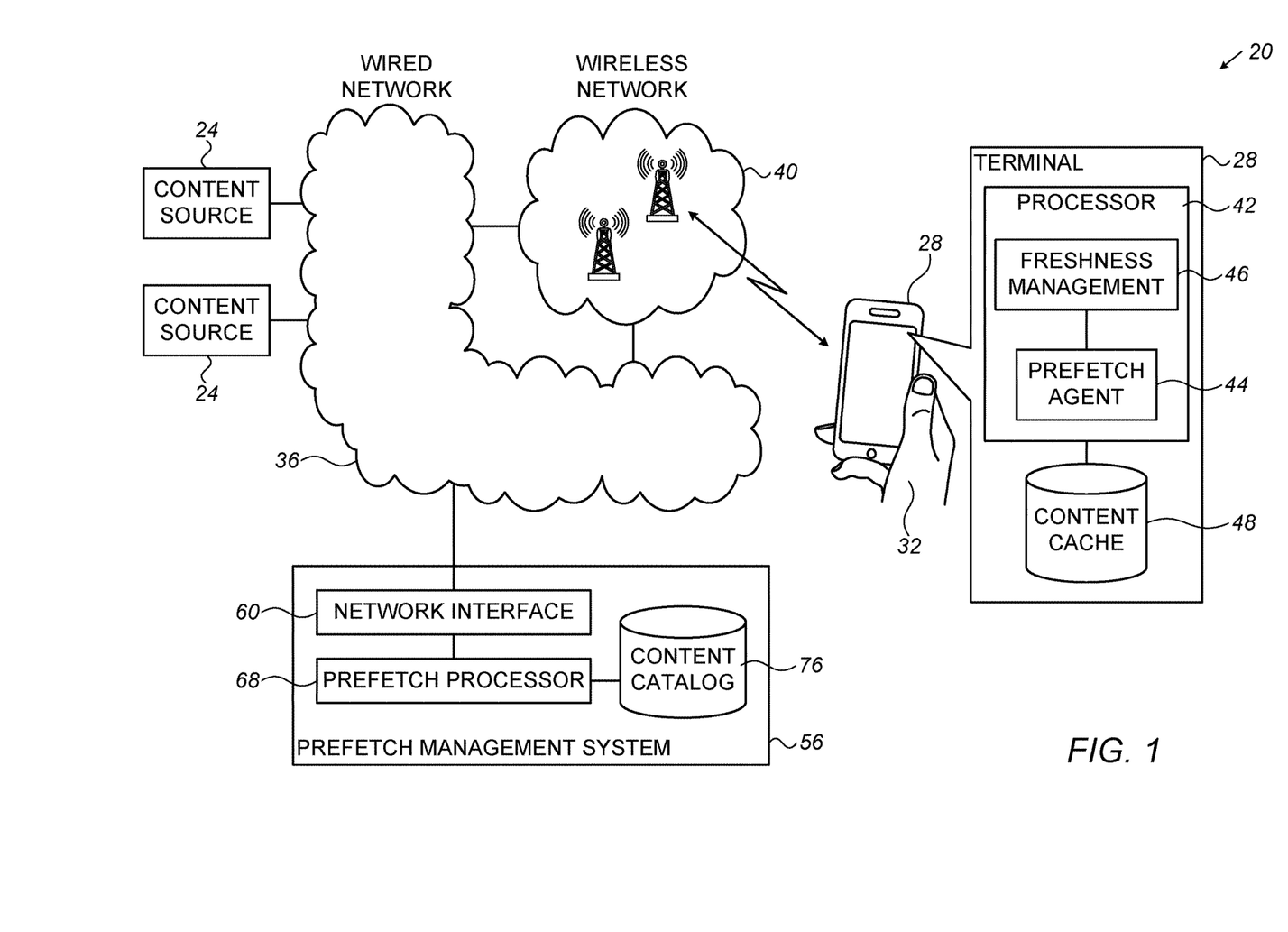
FIG. 1 is a block diagram that schematically illustrates a system for delivering content to communication terminals, in accordance with an embodiment of the present invention.

FIG. 1 is a block diagram that schematically illustrates a system 20 for delivering content to communication terminals, in accordance with an embodiment of the present invention. In the present example, system 20 prefetches content from one or more content sources 24 for use by one or more wireless communication terminals 28 operated by users 32. A system of this sort may be operated, for example, by content providers or by wireless service providers.

In the present context, the term "prefetching" refers to transfer of content from a content source to a communication terminal that is performed not in response to a direct request to consume that specific content by the user. In some cases, the user may trigger a prefetching operation. For example, the user may realize that network service is about to be lost, and trigger prefetching by request "sync-content" or "save for later." Thus, the term "prefetching" also refers to fetching of content before the time it is needed by the user, and caching the content for later access by the user.

Although the embodiments described herein refer mainly to wireless networks, the disclosed techniques can also be used in various wired networks. In a wired network, too, prefetched content may or may not be fresh, and therefore the disclosed techniques are similarly applicable.

Content sources 24 may comprise, for example, Web sites, portals, Content Delivery Networks (CDNs), data centers or any other suitable type of content sources. Terminals 28 may comprise, for example, cellular phones, smartphones, tablet computers, laptop computers, wearables, mobile car devices, smart TVs, or any other suitable device that is capable of presenting content to a user and has wireless communication capabilities. Each terminal 28 comprises one or more suitable output devices for presenting content items to user 32, e.g., a screen or display for displaying content items, a loudspeaker or other audio output device for sounding audio content, or any other suitable output devices. The figure shows a single terminal 28 for the sake of clarity. Real-life implementations, however, typically comprise a large number of terminals 28.

The various elements of system 20, e.g., content sources 24 and terminals 28, communicate with one another over one or more wired or wireless communication networks. In the present example, content sources 24 are accessed over a wired network 36 (e.g., the Internet) that is connected to a wireless network 40 (e.g., a cellular or Wi-Fi network) that serves terminals 28. The end-to-end content paths from the content sources to the terminals therefore typically traverse both wired and wireless links. In the present context, the network or combination of wireline and/or wireless networks over which content is delivered from sources 24 to terminals 28 is referred to as "a communication network" or "a network."

Each terminal 28 comprises suitable radio and baseband circuitry (not shown in the figure) that serves as an interface for connecting to network 40. Each terminal 28 further comprises a processor 42 that, among other tasks, runs a prefetch agent 44. Each terminal 28 additionally comprises a respective content cache 48 for temporarily storing content items. Content items (e.g., Web pages) that are cached in cache 48 can be served to user 32 (e.g., displayed on a browser or an application ("app") running in the terminal) with small latency, without incurring the latency of content retrieval from content source 24.

In addition, processor 42 runs a freshness management module 46. Module 46 assesses the freshness of various content items, and controls the presentation of the content items to user 32 based on the assessed freshness. The operation of module 46 is addressed in detail further below.

In the example of FIG. 1, system 20 further comprises a prefetch management system 56 connected to network 36. Prefetch management system 56 comprises a network interface 60 for connecting to network 36, a processor 68 that carries out the disclosed techniques in conjunction with agents 44 and modules 46 in terminals 28, and a memory 76 that stores a content catalog.

Each prefetch agent 44 is typically configured to manage its respective content cache 48, intercept content requests generated in terminal 28, and serve the requested content from the cache or from the content sources as appropriate. In some embodiments, agent 44 is also configured to track usage patterns of user 32 for assisting in specifying prefetching policies. Agent 44 may track, for example, the content consumption pattern of the user as a function of time, the geographical location of the terminal as a function of time, and the availability of different communication capabilities (e.g., the available bandwidth or the availability of Wi-Fi vs. cellular access) at different times. Agent 44 may also track the characteristics of various available communication channels (e.g., Wi-Fi or cellular), such as congestion level, speed, latency, receiver signal-to-noise ratio (SNR), receiver channel quality indicator (CQI), and/or any other suitable parameters.

Agent 44 typically provides the collected information to processor 68. In some embodiments agent 44 may track, log and report additional information, such as terminal status (e.g., battery status, available memory or CPU resources, or error events) or network status (e.g., network speed and load, or availability of Wi-Fi connectivity). All of these parameters may be considered and used in specifying the prefetching policy.

In some embodiments, prefetch agent 44 may request and receive from processor 68 an updated prefetching policy. Agent 44 may then decide whether to issue a prefetch request based on the policy and other relevant factors (e.g., battery level, network connection quality, content already present in cache 48). The content items can be prefetched via processor 68, or directly from content source 24.

In various embodiments, specifying the prefetching policy may involve estimating, for each content item, the likelihood that user 32 will request access to this content item within a certain upcoming period of time. These likelihood metrics may be sent to agent 44, in order to assist agent 44 in prioritizing prefetching of different content items. The estimation of the likelihood that a content item will be accessed may consider many factors, such as user-related factors (e.g., gender, location, interests, recent and historical Internet activity), environment-related factors (e.g., time-of-day, traffic conditions, weather, current events, sporting occasions), and/or content-related factors (e.g., content topic/category, content keywords, identity of content source, current popularity/rating of content).

In addition to the likelihood of the user accessing certain content items, the prefetching policy may also consider factors such as power consumption (e.g., preferring to prefetch when Wi-Fi connection is available or when a strong cellular connection is available), transmit cost (e.g., preferring to prefetch during lower-cost times-of-day), network congestion and server load (e.g., preferring to prefetch during off-peak traffic hours), and/or any other suitable user or network related considerations.

Specification of the prefetching policy may also involve associating certain times-of-day with a prefetch operation priority level. This association can be established separately for different apps or content sources, or jointly for multiple apps or content sources. One factor in determining the prefetch priority levels is the estimated likelihood of the user accessing the different apps or content during the various times-of-day.

Certain aspects of prefetching content using this sort of system configuration are addressed in U.S. Patent Application Publication 2016/0021211, entitled "Efficient Content Delivery over Wireless Networks Using Guaranteed Prefetching at Selected Times-Of-Day," which is assigned to the assignee of the present patent application and whose disclosure is incorporated herein by reference.

The configurations of system 20 and its various elements shown in FIG. 1 are example configurations, which are chosen purely for the sake of conceptual clarity. In alternative embodiments, any other suitable configurations can be used. For example, the functions of prefetch management system 56 can be implemented using any desired number of processors, or even in a single processor. The various system functions can be partitioned among the processors in any suitable way. Prefetch management system 56 may be implemented as a cloud application, e.g., using private or public cloud resources.

Prefetch agent 44 may intercept content requests in terminal 28 in various ways. In one embodiment, agent 44 and/or module 46 are implemented as an app running in terminal 28, embedded in an app running in terminal 28, or implemented as a Software Development Kit (SDK) embedded in an app or as part of the terminal Operating System (OS). In another embodiment, terminal 28 may run a proxy server, which is controlled by agent 44 and is exposed to incoming and outgoing traffic. Further alternatively, the disclosed techniques can be implemented entirely on the network side without any prefetching agent on the terminal side.

The different elements of system 20 may be implemented using suitable software, using suitable hardware, e.g., using one or more Application-Specific Integrated Circuits (ASICs) or Field-Programmable Gate Arrays (FPGAs), or using a combination of hardware and software elements. Content cache 48 and content catalog 76 may be implemented using any suitable memory or storage device. In some embodiments, agent 44, module 46 and/or processor 68 are implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Freshness-Aware Presentation of Content

In some embodiments, freshness management module 46 in terminal 28 assesses the extent of freshness of content items that are cached in cache 48, and decides whether and how to present the content items depending on the assessed extent of freshness. Content items may comprise, for example, Web pages, images, files, video clips, audio clips, or any other suitable type of content.

Typically, when responding to a request for a certain content item, prefetch agent 44 presents a cached version of the content item if one exists in cache 48, regardless of whether the cached version is fresh or not. Later or in parallel, freshness management module 46 assesses the extent of freshness of the cached content item, and conditionally modifies the presentation of the content item based on the assessed extent of freshness.

In some embodiments, the HTTP response header associated with the cached content item may comprise fields such as "max age", "expiry", "entity tag" (etag) or "last-modification date". In some embodiments module 46 disregards these headers and determines the extent of freshness regardless of the header field values. For example, the HTTP response header of a cached content item may indicate that it is specified to expire after a certain time interval. Module 46 may ignore this specification and assess the extent of freshness in a different, independent manner. In other embodiments, module 46 may consider the HTTP response header as part of the freshness assessment. In one example embodiments, when operating in a "guaranteed prefetching mode" as defined in U.S. Patent Application Publication 2016/0021211, cited above, the HTTP headers are ignored. When operating in a "best-effort prefetching mode" the HTTP headers are considered.

In various embodiments, module 46 may assess the extent of freshness of a cached content item in various ways. In some embodiments, the extent of freshness of a cached content item relates to whether or not a more updated version of the content item is available over the communication network, e.g., in content sources 24. In an example embodiment, if the version of the content item cached in cache 48 is the most up-to-date version available, module 46 regards the cached content item as fresh. If a more up-to-date version of the content item is available over the network, module 46 considers the cached content item not fresh. Alternative embodiments, in which a cached content item may be considered fresh even if a slightly different version is available, are described further below.

In some embodiments, the extent of freshness relates to the actual age of the content item, e.g., the time that elapsed since the content item was obtained (e.g., prefetched) and saved in cache 48, the time that elapsed since the content item was created, or the time that elapsed since the freshness of the content item was most-recently assessed. In this example, the extent of freshness may be independent of whether a more up-to-date version is available or not. Typically, the newer the content item (e.g., since its creation or since it was prefetched), the fresher it is considered.

In some embodiments, the cached content item has a certain version number, and module 46 assesses the extent of freshness depending on that version number. The version number can be specified, for example, using the "entity tag" (etag) or "last-modification date" value in the HTTP header of the content. Any other form of specifying version number can also be used. Module 46 may translate the version number into an extent of freshness, for example, based on the difference in version numbers between the cached content item and the most up-to-date version of the content item available over the network. If the cached content item comprises a time stamp indicative of its creation time, module 46 may assess the extent of freshness based on the creation time (possibly after compensating for the clock difference between the terminal and the entity that created the content item).

In some embodiments, module 46 receives a list of expiry times specified for content items. The list may be provided, for example, by prefetch management system 56 or by content sources 24. A content item that exceeds the respective expiry time defined on the list is regarded by module 46 as not fresh, and vice versa.

In some embodiments, the list specifies individual expiry times for individual content items. In other embodiments, the list specifies expiry times for groups of content items, e.g., collectively for the content items of a given type. For example, cached images may be specified an expiry time of two hours from the most recent prefetch operation, while HTML files may be specified an expiry time of only two minutes from the most recent prefetch operation. Any other suitable expiry times can be specified.

In some embodiments, module 46 prefetches the list of expiry times as part of each prefetching session. In other embodiments, module 46 obtains the list periodically, e.g., once a day. The latter possibility is useful, for example, when expiry times are specified per group (e.g., per type) of content items. In yet other embodiments, the expiry times may be pre-configured a-priori. In an example embodiment, the expiry times are pre-configured to some short value. For example, module 46 may regard a content item as fresh if the content item is requested less than X seconds after it was placed in cache 48, and not fresh otherwise.

In an embodiment, one or more of the expiry times on the list may be specified using absolute time (e.g., a content item set to expire on a specified date and time). In this embodiment, the time-of-day clocks in terminal 28 and in the entity generating the list (e.g., processor 68) should be at least approximately synchronized.

In an embodiment, one or more of the expiry times on the list may be specified using relative or differential time (e.g., a content item set to expire a certain time period after it was prefetched, or at least set to be tested for the presence of an updated version). The latter embodiment eliminates the need for time synchronization, but may add some time uncertainty as to the actual time needed to prefetch the content item. This uncertainty is usually small, but can be estimated by module 46 if needed. In some embodiments, the expiry times for content items are reported using optional "expires" and "max age" fields in HTTP response headers.

In some embodiments, module 46 calculates a signature over the cached version of the content item, and compares this signature with the signature of the up-to-date version of the content item available over the network. If the signatures are the same, i.e., match, module 46 concludes that the cached version is fresh, and vice versa. The signature may comprise, for example, a Cyclic Redundancy Check (CRC) value, a Message Digest 5 (MD5) hash value, a suitable error detection code, or any other suitable signature.

In some embodiments, module 46 occasionally (e.g., periodically) receives from prefetch management system 56 a list of up-to-date content items available over the network, along with the respective signature values of these content items. The signature values can then be compared to the signature values of the corresponding cached content items. The use of signatures enables module 46 to assess the freshness of content items without obtaining the actual updated content items over the network.

The example freshness measures and criteria described above are depicted purely by way of example. In alternative embodiments, module 46 and system 20 as a whole may define and assess the extent of freshness of content items in any other suitable way and using any other suitable freshness measure or criterion. In some embodiments, module 46 may combine multiple types of freshness measures for a given content item. In some embodiments, module 46 may use different freshness measures for different content items, e.g., to different types of content. For example, for some cached content items module 46 may assess the extent of freshness by checking whether an updated version is available over the network, whereas for other cached content items module 46 may assess the extent of freshness based on age.

Figure 2:
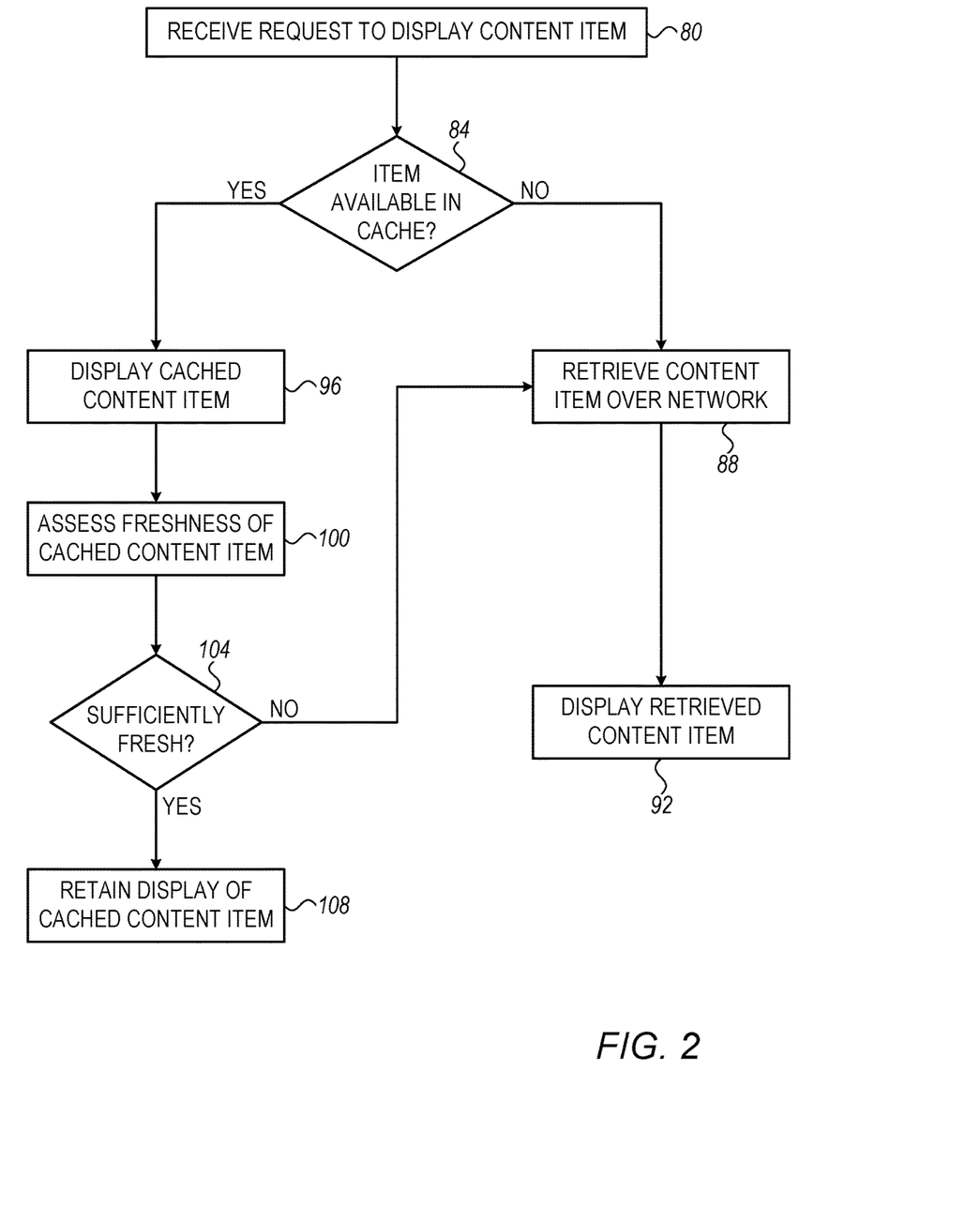
FIG. 2 is a flow chart that schematically illustrates a method for freshness-aware presentation of content, in accordance with an embodiment of the present invention.

FIG. 2 is a flow chart that schematically illustrates a method for freshness-aware presentation of content, in accordance with an embodiment of the present invention. The method begins with prefetch agent 44 receiving a request from an application running on processor 42 to retrieve a content item, at a content requesting step 80. Agent 44 first checks whether a version of the requested content item is available in cache 48, at a cache checking step 84.

If no version of the requested content item is available in cache 48, agent 44 retrieves the content item over the network, at a retrieval step 88, and presents the retrieved content item to user 32, at a retrieved presentation step 92.

Otherwise, i.e., if a version of the requested content item is available in cache 48, agent 44 presents the cached content item to user 32, at a cached presentation step 96. In addition, freshness management module 46 assesses the extent of freshness of the cached content item, at a freshness estimation step 100. Any suitable method, such as the example methods described above, can be used for assessing the extent of freshness.

At a freshness checking step 104, module 46 then checks whether, based on the result of step 100, the content item is sufficiently fresh or not. As noted above, in some embodiments the extent of freshness is binary, i.e., a content item may be regarded either as fresh or not fresh. In other embodiments, the extent of freshness is softer and allows a more quantitative assessment of freshness. Examples for soft assessment of freshness, and criteria for regarding a content item as "sufficiently fresh," are given further below.

If the content item is found to be sufficiently fresh, no action is needed, and terminal 28 continues to present the cached version of the content item. If the content item is found not sufficiently fresh, the method proceeds to retrieval step 88 in which agent 44 retrieves an updated version of the content item over the network. Agent 44 then presents the retrieved version of the content item at retrieved presentation step 92.

The method flow above is an example flow that is depicted purely for the sake of conceptual clarity. In alternative embodiments, any other suitable flow can be used. For example, the description above gives one possible partitioning of tasks between agent 44 and module 46. In alternative embodiments, any other suitable "division of labor" can be used. Generally, all the tasks described above can be performed by any suitable module running on processor 42 of terminal 28.

In some embodiments, module 46 considers the type of content item in deciding whether or not to present the cached content before verifying its freshness. For example, it is typically difficult to restart a fresher version of a video clip after an older version already began playing. As another example, if the cached version of a content item comprises executable scripts (e.g., Java scripts) that already began execution, it may be harmful to execute newer versions of these scripts again after receiving the updated content item. Since Java scripts are often included asynchronously, in one embodiment module 46 may distinguish between synchronous and asynchronous components of the content item, and present the content item once all its synchronous components are available. In this embodiment, module 46 presents the synchronous components of the cached version of the content item, and in parallel verifies the content-item freshness before presenting the asynchronous components. This solution prevents, for example, premature execution of Java scripts.

As another example, in the flow of FIG. 2 module 46 assesses the extent of freshness of a content item in response to a request from an application (at step 80). In alternative embodiments, module 46 assesses the extent of freshness regardless of such requests. For example, module 46 may occasionally (e.g., periodically) scan the content items in cache 48, assess their freshness, and discard (or at least mark as invalid) content items that are not sufficiently fresh. Module 46 may also assess the freshness of content items used by a certain application when the application is started.

In an embodiment, prefetch agent 44 retrieves the latest version of a content item over the network by using the "if-modified-since" HTTP header (a conditional HTTP request in which the server returns an updated version of the requested content only if the content was modified since a time indicated in the request, and a "not modified" indication otherwise). In another embodiment, prefetch agent 44 retrieves a more up-to-date version of a content item over the network by using "if-none-match" with the etag value in the HTTP header. These implementations are fast and efficient, but need to be supported on the server (e.g., content source) side.

In some embodiments, module 46 calculates a certain soft distance metric between the cached version of the content item (available locally in cache 48) and the up-to-date version of the content item (available over the network). This freshness metric is used by module 46 to decide whether the cached version is sufficiently fresh. For example, module 46 may compare the distance metric to a predefined threshold. If the distance metric falls below the threshold, module 46 continues to present the cached version. If the distance metric is above the threshold, module 46 refrains from presenting the cached version, or stops presenting the cached version if already presented. Various examples of soft freshness metrics are suggested in the next section, further below. Any of these metrics, or any other suitable metric, can be used for this purpose.

As noted above, in some embodiments module 46 receives from prefetch management system 56 a list of up-to-date content items available over the network. This list is typically user-specific. In some embodiment, the list provided by prefetch management system 56 specifies, for each content item, the distance metric between the up-to-date version available over the network and the cached version the terminal already has. In these embodiments, module 46 may use the distance metrics reported in the list to decide whether or not to prefetch a content item. In some embodiments, the freshness distance metric of a content item can be reported in the list along with a respective access-likelihood metric (indicative of how likely the user is to access this content item). In some embodiments, the prefetch management system combines both metrics (freshness distance metric and access-likelihood metric) into a composite prefetch priority metric. This composite metric is recorded in catalog 76 and reported to the terminal as part of the list of available content items.

In some embodiments, the freshness distance metric can be used in the case of differential prefetch updates, to indicate the relative importance of the corresponding differential update. This metric can be recorded in catalog and used to determine whether to prefetch the differential update or not.

Deliberate Presentation of Non-Fresh Content

In some embodiments, freshness management module 46 presents the cached version of a content item (or permits agent 44 to present it), even though module 46 is aware that a more up-to-date version of the content item is available over the network.

For example, in some embodiments module 46 calculates some distance metric between the cached version of the content item (available locally in cache 48) and the up-to-date version of the content item (available over the network). Module 46 decides to present the cached version, and not the up-to-date version, if the distance metric is smaller than a predefined threshold value. This decision can be used, for example, in carrying out freshness checking step 104 of the method of FIG. 2. In an embodiment, module 46 uses a predefined set of rules for deciding whether the distance metric is sufficiently small to justify presenting the cached version.

Module 46 may use any suitable distance metric and any suitable threshold value for making the above-described decision. Different distance metrics and/or different threshold values may be applicable to different types of content items. For example, Module 46 may decide to present the cached version instead of retrieving and presenting the up-to-date version if:

For an app's feed, the description of the articles referenced are identical in the two versions, and each headline in the cached feed version differs by less than a predefined number of characters from the corresponding headline in the up-to-date version.

For an app's feed, the headlines of the articles referenced are identical in the two versions, and each article description in the cached feed version differs by less than a predefined number of characters from the corresponding article description in the up-to-date feed version.

The article descriptions and headlines are identical, but are displayed in a different order in the cached feed version and in the up-to-date feed version.

The first K articles referenced in the app's feed are identical in headlines and descriptions (but major differences may exist in the subsequent articles). K is a predefined integer. K may be selected, for example, to span the articles that are initially visible to the user, before the user scrolls or otherwise requests to view the subsequent articles.

The time stamp difference (or other age metric) between the cached version and the up-to-date version is less than a predefined time duration (e.g., 300 seconds).

For an image content item, the cached version differs from the up-to-date version by less than a predefined number of pixels.

In some embodiments, module 46 may compare the text of the cached version and the text of the up-to-date version using algorithms that understand the meaning of the text rather than performing character-level or even word-level or phrase-level comparison. In some cases, a small difference in the text implies a major difference in meaning (e.g., when the entire meaning is negated by adding the single word "not" to the text).

As another example, module 46 may decide to present the cached version of an image if the cached version differs from the up-to-date version only in absolute brightness, absolute contrast or other absolute measure that applies to the image as a whole but not to its details. In other words, when comparing the cached version and the up-to-date version of an image, module 46 may remove effects such as color bias and normalize the dynamic range of the two versions before comparing. As another example, module 46 may decide to present the cached version if the two versions differ in size, resolution or color histogram, but essentially display the same information. In one example, module 46 decides to present the cached version if its color histogram differs from the color histogram of the up-to-date version by less than a predefined difference.

For a video content item, any of the above distance metrics can be used for comparing corresponding frames in the cached version and the up-to-date version. Additionally or alternatively, module 46 may decide to present the cached version if the two versions have sufficiently similar motion prediction vectors, or sufficiently similar MPEG anchor frames. As another example, module 46 may decide to present the cached version if the two versions are identical in a predefined number of strongest DCT coefficients. The comparison of dominant DCT coefficients may be performed on all frames, or only on selected frames such as anchor frames.

As for still images, module 46 may decide to present the cached version of a video content item if the cached version and the up-to-date version are essentially the same but differ in video quality (e.g., resolution) by less than a predefined threshold.

In some embodiments, module 46 uses multiple freshness thresholds. If the extent of freshness is larger than an upper threshold denoted T1, module 46 presents the cached version and does not replace it even if a newer version is available. If the extent of freshness is below a lower threshold denoted T2 (e.g., based on catalog 76), module 46 does not present the cached version at all (or stops presenting it if it is already presented), and fetches and presents the up-to-date version. If the extent of freshness falls between T1 and T2, module 46 proceeds to fetch the up-to-date version, but in the meantime keeps presenting the cached version.

In various embodiments, module 46 may use any of the freshness distance metrics described herein, and/or any of the extents of freshness described herein, for (i) deciding whether to present the cached version or not, (ii) deciding whether to present the cached version while obtaining the up-to-date version, or both. Any of the freshness distance metrics and/or extents of freshness described herein may be recorded in catalog by system 56 and reported to terminal 28. In some embodiments the catalog records a characteristic of the up-to-date version (e.g., color histogram), and module 46 compares the characteristic in the catalog with the corresponding characteristic (e.g., color histogram) of the cached version.

In some embodiments, if the distance metric is too high (e.g., higher than a predefined threshold), module 46 does not present the cached version at all. Otherwise, module 46 presents the cached version and, while the cached version is presented, checks for the most up-to-date version over the network.

In some embodiments, the content provider or system 56 provides metrics or characteristics of the most up-to-date versions, and module 46 accesses the freshness metrics or characteristics over the network. In other embodiments, module 46 or agent 44 downloads the most up-to-date versions over the network to the terminal, and then module 46 calculates and verifies the freshness metrics. If the difference in freshness is small enough, e.g., below some threshold, agent 46 refrains from replacing the currently-presented content with the more up-to-date content. If the difference is larger, module 46 replaces the currently-presented content with the more up-to-date content.

Additionally or alternatively, module 46 may decide to present the cached version and not the up-to-date version if the cost of retrieving the up-to-date version over the network is estimated to be above some predefined cost threshold. The cost in this context may refer to monetary cost to user 32, energy consumption from the battery of terminal 28, or any other suitable cost measure.

Visual Freshness Indications to the User

In some embodiments, freshness management module 46 in terminal 28 presents to user 32 visual indications that are indicative of the extent of freshness of the content being presented. The visual indications are useful, for example, for warning the user that the displayed version of the content is not (or not necessarily) the most up-to-date version, or for reassuring the user that the displayed version is up-to-date.

Visual indications of this sort are especially important when, as explained above, module 46 deliberately decides not to present the most up-to-date version of the content. Nevertheless, module 46 may also present visual freshness indications when presenting the most up-to-date version of the content.

Module 46 may display any suitable type of visual indications. Some example indications are present only when the content item is considered not fresh, and omitted when the content item is considered fresh. Some example indications are binary (i.e., fresh vs. not fresh). Other possible indications quantify the extent of freshness, for example by displaying the age of the content item (e.g., the time that elapsed since the content item was created, since the content item was prefetched, or since the content item freshness was last verified).

Figure 3A:
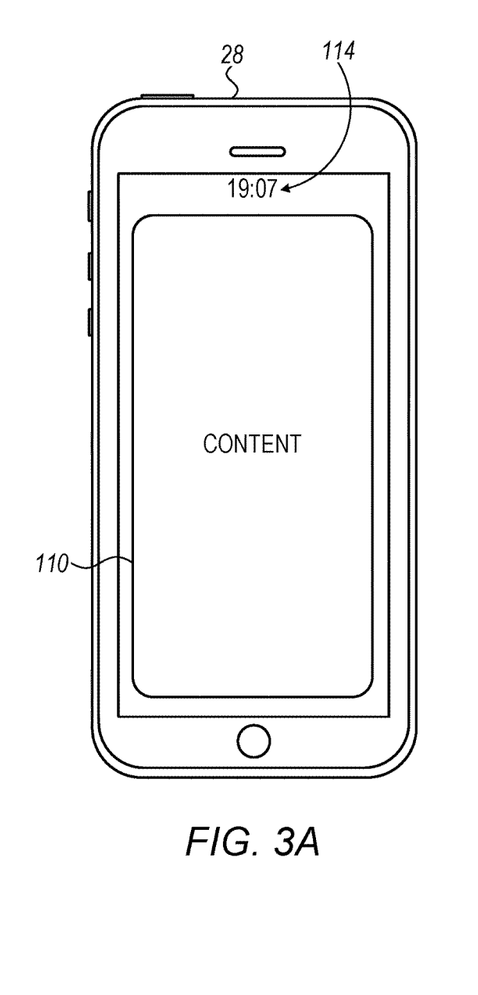
FIGS. 3A, 3B and 4 are schematic illustrations of content freshness indications displayed on a communication terminal, in accordance with embodiments of the present invention.
Figure 3B:
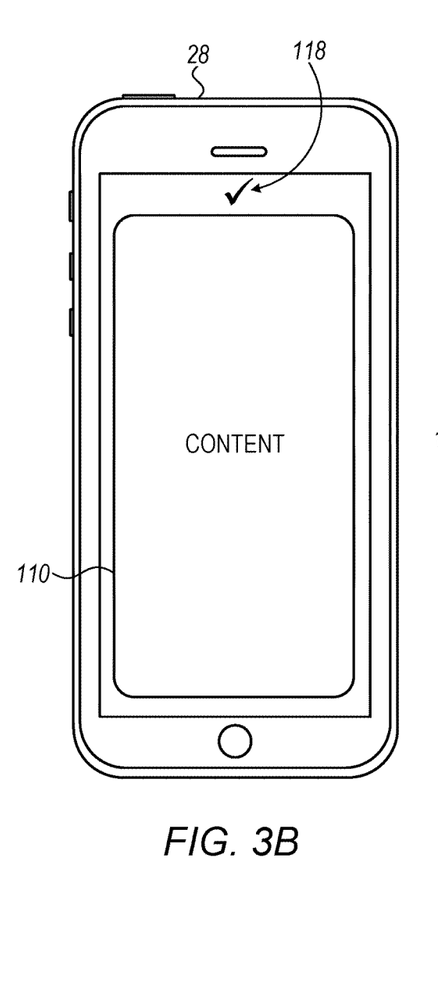

FIGS. 3A and 3B are schematic illustrations of content freshness indications displayed by module 46 on the display of terminal 28, in accordance with an embodiment of the present invention. In this example, a content item 110 is being displayed to the user at a given point in time.

FIG. 3A shows the visual indication that is displayed when module 46 considers the content item not fresh. In such a case, module 46 displays a time stamp 114 indicative of the extent of freshness of the content item. As explained above, the time stamp may indicate, for example, the time at which the content item was created, the time at which the content item was retrieved (e.g., prefetched) over the network, or the time at which the freshness of the content item was most-recently verified. Alternatively, any other suitable age metric can be displayed instead of a time stamp.

FIG. 3B shows the visual indication that is displayed when module 46 considers the content item fresh. In such a case, module 46 displays an icon, in the present example, a green checkmark. In an alternative embodiment, module 46 may not display any freshness indication when the content item is considered fresh.

Figure 4:
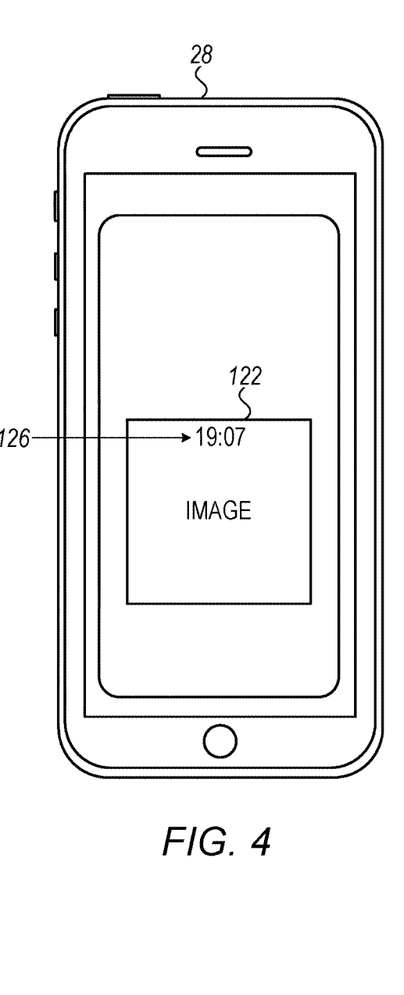

FIG. 4 is a schematic illustration of a content freshness indication displayed by module 46 on the display of terminal 28, in accordance with another embodiment of the present invention. In this embodiment, an image content item 122 is displayed at a given point in time. When the content is considered not fresh, module 46 displays a time stamp 126 as a watermark in the background of image 122. In some embodiments, when multiple images are displayed simultaneously, module 46 may display a watermark time stamp (or other freshness indication) only for the oldest (least fresh) image. Alternatively, module 46 may display a respective watermark time stamp (or other freshness indication) for each image that is considered not fresh.

The freshness indications described above are depicted purely by way of example. In alternative embodiment, module 46 may present any other suitable type of indications that are indicative of the extent of freshness of the content being presented.

Unverifiable Freshness Scenarios

In some practical scenarios, module 46 may sometimes be unable to verify whether the cached version of a content item is fresh or not, or to generally assess the extent of freshness of a cached content item. Such a scenario may occur, for example, when terminal 28 temporarily loses communication with the network, e.g., after user 32 moves outside the coverage area of the network, or for any other reason.

Module 46 may apply various types of logic for deciding whether and how to present a cached content item whose freshness cannot be verified. In one embodiment, module 46 may decide to nevertheless present the cached version. In an embodiment, in such a case module 46 presents the cached version, together with a suitable visual indication. The visual indication may indicate that the content item is no fresher than the time it was obtained (e.g., prefetched), or no fresher than its time stamp.

Additionally or alternatively, module 46 may display an indication that a network connection is currently unavailable, to help convey to user 32 that the displayed content is not necessarily up-to-date. In an embodiment, module 46 may decide that the content item is too old, and refrain from presenting it. This decision may be accompanied by an indication that network connection is currently unavailable.

Although the embodiments described herein mainly address content prefetching, the methods and systems described herein can also be used in other applications in which a cached version of a content item may have different extents of freshness. For example, a content item might be fetched and presented to the user in real-time, but then retained in the cache in case the user requests the content again. As another example, a document may be modified collaboratively by multiple users over the network. When one user opens the document for viewing or editing, the terminal would typically present the most recent version that is cached locally, and in parallel obtain the newest version over the network. As yet another example, in online gaming, multiple users may play an online game together. When one user accesses the game, the terminal may initially present the most recent state of the game as it is cached locally. In parallel, the terminal would typically check for a newer version over the network. Thus, the disclosed techniques are in no way limited to prefetching, and can be used in a similar manner in any application that involves data freshness.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
caching content items in a cache memory of a communication terminal connected to a communication network;
receiving, in a processor, a request to present a content item to a user of the communication terminal; and
in response to the request:
initially presenting to the user a cached version of the content item, which is cached in the cache memory;
fetching an updated version of the content item over the communication network to the communication terminal;
assessing, in the communication terminal, an extent of freshness of the initially-presented cached version with respect to the updated version;
if the extent of freshness is below a threshold, presenting the updated version to the user in place of the initially-presented version; and
if the extent of freshness is above the threshold, continuing to present the initially-presented version and refraining from presenting the updated version, even though the updated version has already been fetched to the communication terminal.

2. The method according to claim 1, wherein caching the content items comprises prefetching the content items over the communication network.

3. The method according to claim 1, wherein initially presenting the cached version is performed regardless of the extent of freshness of the cached version.

4. The method according to claim 1, wherein assessing the extent of freshness comprises determining a soft, non-binary freshness metric for a difference in content between the cached version and the updated version of the content item.

5. The method according to claim 1, wherein assessing the extent of freshness comprises comparing a first signature, which is calculated over the cached version of the content item, with a second signature, which is calculated over the updated version of the content item.

6. The method according to claim 1, wherein assessing the extent of freshness comprises disregarding a freshness-related field in a header of a HTTP response in which the cached version of the content item was provided to the communication terminal.

7. The method according to claim 6, wherein disregarding the freshness-related field is performed when operating in a guaranteed-prefetching mode, and not when operating in a best-effort prefetching mode.

8. The method according to claim 1, wherein assessing the extent of freshness comprises setting the extent of freshness also based on an expiry time reported for the content item.

9. The method according to claim 1, wherein assessing the extent of freshness comprises setting the extent of freshness also based on an age metric or version number of the content item.

10. The method according to claim 1, and comprising presenting to the user an indication indicative of the extent of freshness of the presented content item.

11. The method according to claim 10, wherein presenting the indication comprises presenting a first visual indication when the content item is assessed to be fresh, and a second visual indication, different from the first visual indication, when the content item is assessed to be not fresh.

12. The method according to claim 10, wherein presenting the indication comprises presenting the indication when the content item is assessed to be not fresh, and not presenting the indication when the content item is assessed to be fresh.

13. A communication terminal, comprising:
a cache memory; and
a processor, configured to:
cache content items in the cache memory;
receive a request to present a content item to a user of the communication terminal; and
in response to the request:
initially present to the user a cached version of the content item, which is cached in the cache memory;
fetch an updated version of the content item over the communication network to the communication terminal;
assess, in the communication terminal, an extent of freshness of the initially-presented cached version with respect to the updated version;
if the extent of freshness is below a threshold, present the updated version to the user in place of the initially-presented version; and
if the extent of freshness is above the threshold, continue to present the initially-presented version and refrain from presenting the updated version, even though the updated version has already been fetched to the communication terminal.

14. The terminal according to claim 13, wherein the processor is configured to prefetch the content items over the communication network, and to cache the prefetched content items.

15. The terminal according to claim 13, wherein the processor is configured to initially present the cached version regardless of the extent of freshness of the cached version.

16. The terminal according to claim 13, wherein the processor is configured to assess the extent of freshness by determining a soft, non-binary freshness metric fore a difference in content between the cached version and the updated version.

17. The terminal according to claim 13, wherein the processor is configured to assess the extent of freshness by comparing a first signature, which is calculated over the cached version of the content item, with a second signature, which is calculated over the updated version of the content item.

18. The terminal according to claim 13, wherein the processor is configured to assess the extent of freshness while disregarding a freshness-related field in a header of a HTTP response in which the cached version was provided to the communication terminal.

19. The terminal according to claim 18, wherein the processor is configured to disregard the freshness-related field when operating in a guaranteed-prefetching mode, and not when operating in a best-effort prefetching mode.

20. The terminal according to claim 13, wherein the processor is configured to set the extent of freshness also based on an expiry time reported for the content item.

21. The terminal according to claim 13, wherein the processor is configured to set the extent of freshness also based on an age metric or version number of the content item.

22. The terminal according to claim 13, wherein the processor is configured to present to the user an indication indicative of the extent of freshness of the presented content item.

23. The terminal according to claim 22, wherein the processor is configured to present a first visual indication when the content item is assessed to be fresh, and a second visual indication, different from the first visual indication, when the content item is assessed to be not fresh.

24. The terminal according to claim 22, wherein the processor is configured to present the indication when the content item is assessed to be not fresh, and not present the indication when the content item is assessed to be fresh.

25. A computer software product, the product comprising a tangible non-transitory computer-readable medium in which program instructions are stored, which instructions, when read by a processor in a communication terminal, cause the one or more processors to:
cache content items in the cache memory;
receive requests to present a content item to a user of the communication terminal; and
in response to a received request:
initially present to the user a cached version of the content item, which is cached in the cache memory;
fetch an updated version of the content item over the communication network to the communication terminal;
assess, in the communication terminal, an extent of freshness of the initially-presented cached version with respect to the updated version;
if the extent of freshness is below a threshold, present the updated version to the user in place of the initially-presented version; and
if the extent of freshness is above the threshold, continue to present the initially-presented version and refrain from presenting the updated version, even though the updated version has already been fetched to the communication terminal.

26. The method according to claim 1, wherein assessing the extent of freshness comprises assessing depending on a difference in content between the cached version and the updated version of the content item.

27. The terminal according to claim 13, wherein the processor is configured to assess the extent of freshness depending on a difference in content between the cached version and the updated version of the content item.

28. The method according to claim 1, wherein assessing the extent of freshness of the presented cached version comprises determining whether the cached version is sufficiently similar to the updated version.

\* \* \* \* \*